US010808979B2

(12) United States Patent
Yang et al.

(10) Patent No.: US 10,808,979 B2
(45) Date of Patent: Oct. 20, 2020

(54) ICE STORAGE AMOUNT ADJUSTING SYSTEM AND ADJUSTING METHOD FOR THE SAME

(71) Applicant: Chicony Power Technology Co., Ltd., New Taipei (TW)

(72) Inventors: Shen-Min Yang, New Taipei (TW); Cheng-Yi Ho, New Taipei (TW); Wen-Yen Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 54 days.

(21) Appl. No.: 16/226,228

(22) Filed: Dec. 19, 2018

(65) Prior Publication Data
US 2020/0116411 A1 Apr. 16, 2020

(30) Foreign Application Priority Data

Oct. 12, 2018 (TW) .............................. 107136027 A (51) Int. Cl.
*F25C 5/18* (2018.01)
*F25C 5/187* (2018.01)
*F24F 5/00* (2006.01)

(52) U.S. Cl.
CPC ............ *F25C 5/187* (2013.01); *F24F 5/0017* (2013.01); *F24F 2005/0032* (2013.01);
(Continued)

(58) Field of Classification Search
CPC .................... F24F 5/0017; F24F 2005/0032
See application file for complete search history.

(56) References Cited

U.S. PATENT DOCUMENTS 4,916,909 A * 4/1990 Mathur .................... F24F 11/00
62/59
5,228,500 A * 7/1993 Sano ....................... F24F 1/022
165/49
(Continued)

FOREIGN PATENT DOCUMENTS

CN 101963384 A 2/2011
CN 102705957 A 10/2012
(Continued)

OTHER PUBLICATIONS

Prowler, Don. "Sun Control and Shading Devices" WBDG, Sep. 8, 2016, www.wbdg.org/resources/sun-control-and-shading-devices. (Year: 2016).*

(Continued)

*Primary Examiner* — Jonathan Bradford
(74) *Attorney, Agent, or Firm* — Chun-Ming Shih; HDLS IPR Services (57) ABSTRACT

An ice storage amount adjusting system is disclosed. The ice storage amount adjusting system includes a chiller, an air-condition scheduler for outputting a scheduling parameter of an air-conditioner during a first time, an indoor-temperature setting module for outputting indoor-temperature setting condition during the first time, a building exterior-load collecting module for outputting exterior loading factors of a building during the first time, a weather forecasting data collecting module for outputting weather forecasting data during an upcoming second time, and an air-condition loading predictor. The air-condition loading predictor predicts an air-condition loading of the air-conditioner at the second time based on the scheduling parameter, the indoor-temperature setting condition, the exterior loading factors and the weather forecasting data. The chiller
(Continued)

adjusts its ice storage amount to reach a target storage demand based on the predicted air-condition loading.

18 Claims, 5 Drawing Sheets

(52) U.S. Cl.
CPC ...... *F25C 2300/00* (2013.01); *F25C 2500/04* (2013.01); *F25C 2600/04* (2013.01); *F25C 2700/02* (2013.01)

(56) References Cited

U.S. PATENT DOCUMENTS

| | | | |
|---|---|---|---|
| 7,954,726 | B2 | 6/2011 | Siddaramanna et al. |
| 8,172,153 | B1 | 5/2012 | Kennedy et al. |
| 9,869,484 | B2 | 1/2018 | Hester et al. |
| 2016/0305678 | A1 | 10/2016 | Pavlovski et al. |
| 2017/0169344 | A1 | 6/2017 | Mangharam et al. |

FOREIGN PATENT DOCUMENTS

| | | |
|---|---|---|
| CN | 103168278 A | 6/2013 |
| CN | 103574845 A | 2/2014 |
| CN | 203501387 U | 3/2014 |
| CN | 104534617 A | 4/2015 |
| CN | 106403166 A | 2/2017 |
| CN | 205980188 U | 2/2017 |
| TW | 201627614 A | 8/2016 |

OTHER PUBLICATIONS

Office Action dated Jun. 5, 2019 of the corresponding Taiwan patent application No. 107136027.

\* cited by examiner

ICE STORAGE AMOUNT ADJUSTING SYSTEM AND ADJUSTING METHOD FOR THE SAME

BACKGROUND OF THE INVENTION

Technical Field

The present invention relates to an ice storage system and method for storing ice, especially to an ice storage amount adjusting system and a method for adjusting ice storage amount.

Description of Related Art

Large air-conditioner is generally equipped with chiller (ice maker) for making ice. The chiller makes ices during off-peak hour when the utility fee is cheaper, while the air-conditioner uses the pre-manufactured ices for heat exchange during peak hour when the utility fee is more expensive, thus saving the cost for running the air-conditioner.

Generally, the conventional chiller starts running at above-mentioned off-peak hour (such as at night time) and starts ice making procedure after starting. The chiller stops from making ices when the ice tank is full. More particularly, the conventional chiller performs ice making procedure at least one time per day and has fixed ice storage amount for each ice making procedure. However, the internal factors (such as personnel number and activity types) impacting on the air conditioning of the buildings and the external factors (such as temperature and humidity) impacting on the air conditioning of the buildings are varied every day. The resource is wasted if the chiller makes ices with fixed amount every day.

More particularly, in case that the ice storage amount of the chiller is excessive, the unused ices gradually melt as time elapses. This causes energy waste for making unnecessary ice. Besides, the chiller has ice-bridge effect during ice making procedure, namely, the ice grows from the portion near the pipe. The accumulated energy waste is huge if the amount of ice produced by the chiller is beyond the amount required by the air conditioner for everyday day usage.

SUMMARY OF THE INVENTION

It is an object of the present invention to provide an ice storage amount adjusting system and method for the same. The potential loading of the air-conditioner for the coming time can be predicted and the chiller is controlled to make corresponding amount of ice based on the prediction result, thus prevent energy waste.

Accordingly, the present invention provides an ice storage amount adjusting system applied for a building. The system comprises: a central monitoring computer; a chiller communicated with the central monitoring computer and supplying chilled water to an air-conditioner in the building; an air-condition scheduler outputting a scheduling parameter for the air-conditioner during a first time; an indoor temperature setting module outputting an indoor-temperature setting condition during the first time; a building exterior-load collecting module outputting an exterior loading factor during the first time; a weather forecasting data collecting module outputting a weather forecasting data during a second time, wherein the second time is later than the first time; and an air-condition loading predictor communicated with the central monitoring computer through an energy management platform.

The air-condition loading predictor predicts an air-condition loading of the air-conditioner during the second time based on the scheduling parameter, the indoor-temperature setting condition, the exterior loading factor and the weather forecasting data, and the air-condition loading predictor generates a prediction result associated with the air-condition loading and sends the prediction result to the energy management platform. The energy management platform controls the central monitoring computer to output a target ice storage amount based on the prediction result to the chiller, and the chiller adjusts an ice storage amount required in the second time based on the target ice storage amount.

Accordingly, the present invention provides a method for adjusting ice storage amount. The method is applied to a chiller in a building, and comprises: a) using an air-condition scheduler to output a scheduling parameter for the air-conditioner during a first time; b) using an indoor temperature setting module to output an indoor-temperature setting condition during the first time; c) using a building exterior-load collecting module to output an exterior loading factor during the first time; d) using a weather forecasting data collecting module to output a weather forecasting data during second time, wherein the second time is later than the first time; e) predicting an air-condition loading of the air-conditioner during the second time based on the scheduling parameter, the indoor-temperature setting condition, the exterior loading factor, and the weather forecasting data, and generating a prediction result; f) providing the prediction result to an energy management platform; and g) the energy management platform controlling the central monitoring computer to output a target ice storage amount to the chiller based on the prediction result, and the chiller adjusting an ice storage amount required in the second time based on the target ice storage amount.

The system and method according to the present invention can control the chiller to make corresponding amount of ice based on the predicted potential loading for the coming time, this prevent the energy waste due to excessive ice produced by the chiller.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1:
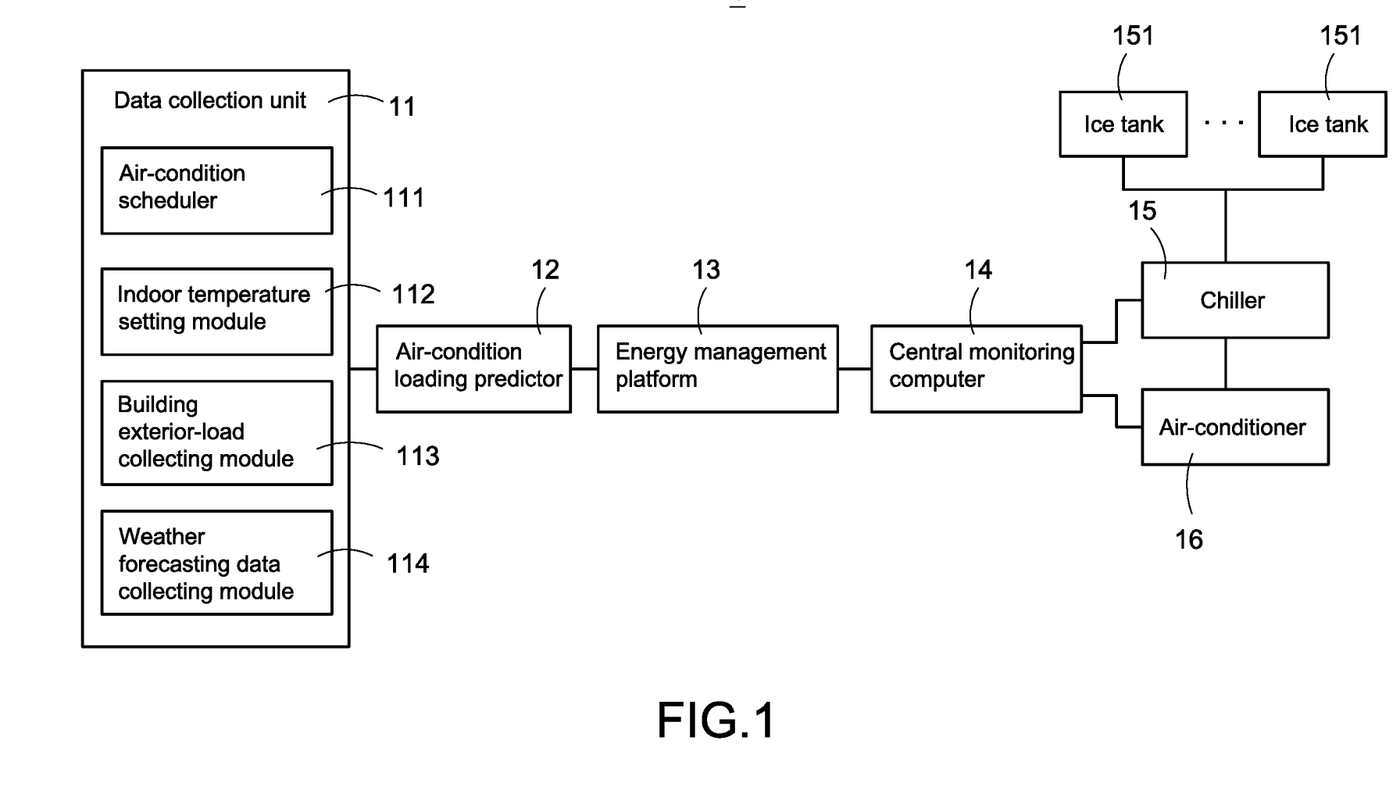
FIG. 1 is a block diagram of the ice storage amount adjusting system according to the first embodiment of the present invention.

FIG. 1 is a block diagram of the ice storage amount adjusting system according to the first embodiment of the present invention. The present invention discloses an ice storage amount adjusting system 1 (hereinafter, the adjusting system 1). The adjusting system 1 comprises a data collection unit 11, an air-condition loading predictor 12, an energy management platform 13, a central monitoring computer 14, and a chiller 15, where the chiller 15 has one or more ice tanks. The chiller 15 is used for making ice and supplying chilled water to an air-conditioner 16 in a building (not shown).

According to an embodiment of the present invention, the central monitoring computer 14 is wiredly or wirelessly connected to the chiller 15 and the air-conditioner 16. The central monitoring computer 14 monitors the current ice amount of the chiller 15 and controls the chiller 15 to perform an ice making procedure based on prediction data (namely, prediction result), which will be detailed later. Besides, the central monitoring computer 14 controls the air-conditioner 16 for conducting operations such as operation time, set temperature, and fan speed, and the central monitoring computer 14 controls the operation mode of the air-conditioner 16 based on the target temperature or the target humidity.

According to the present invention, the adjusting system 1 performs a predict procedure based on data associated with a first time (such as today) and data associated with a second time (such as tomorrow) and predicts a potential loading of the air-conditioner 16 during the second time. Moreover, the adjusting system 1 controls the chiller 15 based on the predicted potential loading such that the chiller 15 produces the ice with amount just meeting the predicted potential loading and will not produce excessive ice. Therefore, the energy waste of the chiller 15 during the ice making procedure can be prevented. In this embodiment, the adjusting system 1 collects the reference data for the prediction procedure through the data collection unit 11. The data collection unit 11 may communicate with the data sources (not shown) to obtain the required reference data for the prediction procedure.

As shown in FIG. 1, the data collection unit 11 comprises an air-condition scheduler 111, an indoor temperature setting module 112, a building exterior-load collecting module 113, and a weather forecasting data collecting module 114. However, the components of the data collection unit 11 are not limited by the embodiment shown in FIG. 1

According to an embodiment of the present invention, the air-condition scheduler 111 communicates with the air-conditioner 16, the central monitoring computer 14, or a building automation system (BA System, not shown) to obtain scheduling parameter of the air-conditioner 16 during the first time. The indoor temperature setting module 112 communicates with the air-conditioner 16, the central monitoring computer 14, or at least one sensor (not shown) inside or outside the building to obtain an indoor-temperature setting condition for the building during the first time.

The building exterior-load collecting module 113 communicates with the central monitoring computer 14 or the BA System to obtain an exterior loading factor for the building during the first time. The weather forecasting data collecting module 114 communicates with the central monitoring computer 14 or the BA System, or connects with a weather forecasting platform (such as National Weather Service) through network communication such as Internet to obtain record of weather forecasting data during the second time (such as hourly outdoor temperature, hourly relative humidity and so on). According to an embodiment of the present invention, the second time is later than the first time. The weather forecasting data collecting module 114 is, for example but not limited, configured to obtain the weather forecasting data during the second time mainly from the weather forecasting platform.

As mentioned above, the air-condition loading predictor 12 may calculate the potential loading of the air-conditioner 16 during the second time by a corresponding algorithm, which will be detailed later, and generate a corresponding prediction result. The adjusting system 1 of the present invention controls the chiller 15 to produce ice based on the prediction result.

Figure 2:
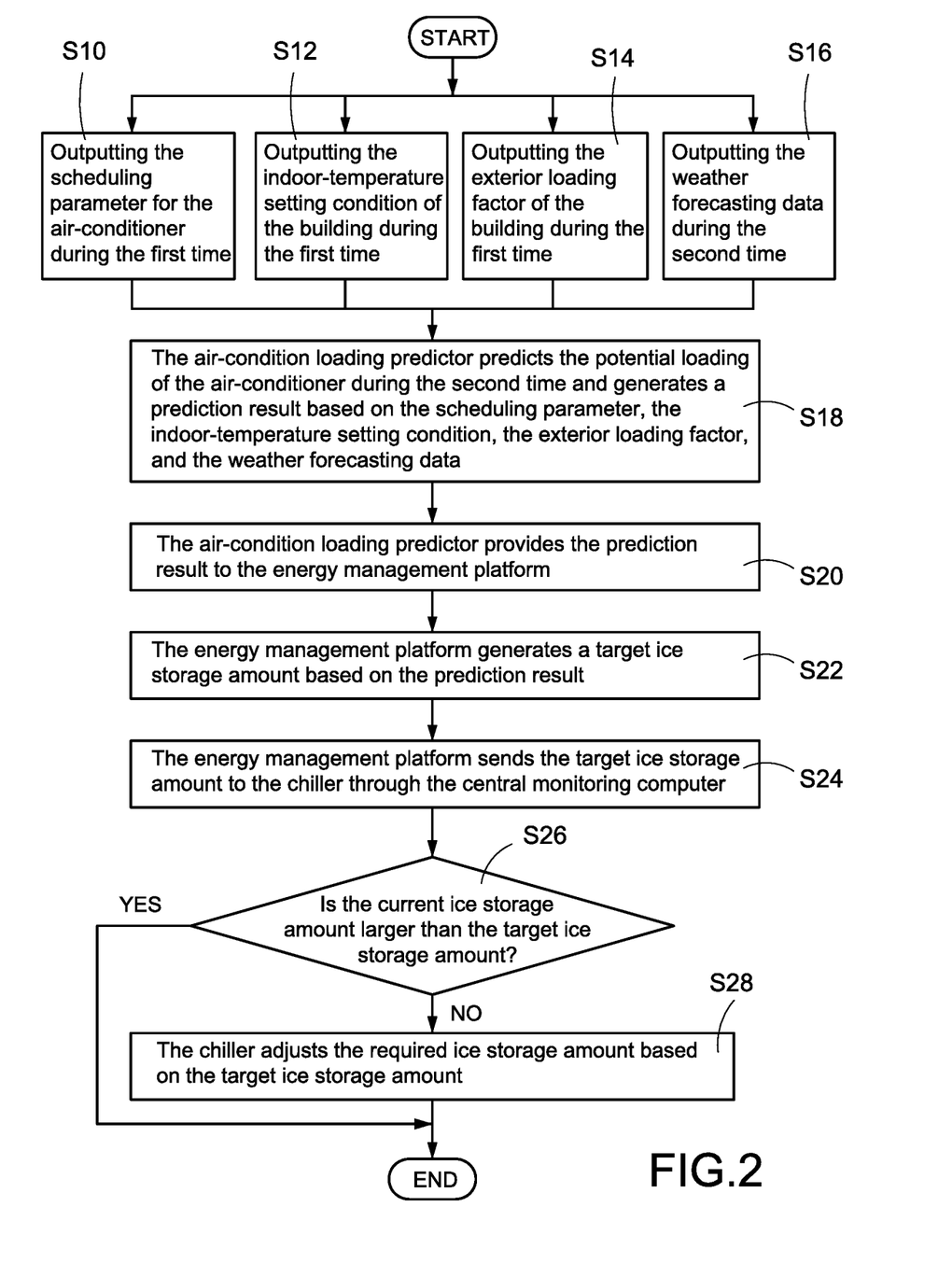
FIG. 2 shows a flowchart of the method for adjusting ice storage amount according to a first embodiment of the present invention.

FIG. 2 shows a flowchart of the method for adjusting ice storage amount according to a first embodiment of the present invention. The present invention discloses a method for adjusting ice storage amount (hereinafter the adjusting method), which can be applied to the adjusting system 1 shown in FIG. 1.

The adjusting system 1 of the present invention mainly controls the operation of the air-conditioner 16 during the first time (such as business hour) to provide basic air-conditioning function for a building. During time after the first time and before the second time reaching, the adjusting system 1 obtains the required reference data through the data collection unit 11 and controls the chiller 15 to perform the ice making procedure based on the required data.

As shown in FIG. 2, before the chiller 15 performs the ice making procedure, the adjusting system 1 of the present invention may obtain and then output the scheduling parameter for the air-conditioner 16 during the first time (step S10). More particularly, the air-conditioner 16 may arrange one or more fan control units (FCU) and one or more heat recovery ventilators (HRV) in the building. In the embodiment, the scheduling parameter is, for example but not limited to, timing schedule (such as turn-on time, or turn-off time) or fan speed for the FCU and HRV during the first time.

At the same time, the adjusting system 1 of the present invention obtains the indoor-temperature setting condition through the indoor temperature setting module 112 and outputs the indoor-temperature setting condition (step S12). More particularly, the indoor temperature setting module 112 calculates the indoor-temperature setting condition based on the indoor temperature and outdoor temperature during the first time. According to one embodiment, the indoor temperature setting module 112 calculates the indoor-temperature setting condition based on following formula:

$$T_{set}=0.48T_{in}+0.14T_{out}+8.22$$

In above formula, $T_{set}$ is the indoor-temperature setting condition, $T_{in}$ is the indoor temperature of the building during the first time, and $T_{out}$ is the outdoor temperature of the building during the first time. According to one embodiment, the indoor temperature setting module 112 may obtain the above temperature $T_{in}$ and $T_{out}$ through the air-conditioner 16, or one or more sensors inside or outside the building, which is not a limitation for the scope of the present invention. More particularly, when the indoor temperature setting module 112 obtains a plurality of indoor temperatures and outdoor temperatures, the indoor temperature setting module 112 may calculate the average values of the indoor temperatures and the outdoor temperatures for the calculation of the indoor-temperature setting condition.

By above formula, the indoor temperature setting module 112 may effectively calculate the indoor temperature setting value optimal to the most comfortableness and best energy saving for the building with given indoor temperature and outdoor temperature.

At the same time, the adjusting system 1 of the present invention calculates the exterior loading factor during the first time with the building exterior-load collecting module 113, and then outputs the exterior loading factor (step S14). More particularly, the building exterior-load collecting module 113 may calculate the exterior loading factor during the first with an E22 energy simulation software, which is free and open software, and the detailed description will not be made here for brevity.

It should be noted that the adjusting system 1 of the present invention directly uses the exterior loading factor as one of the predicting parameters when predicting the loading of the air-conditioner 16 during the second time. The prediction result will be more precise due to the consideration of the latent heat in the building.

More particularly, the building exterior-load collecting module 113 imports the information such as building materials and geographic reference (such as landmark) into the E22 energy simulation software to establish the exterior information for the building. Afterward, the building exterior-load collecting module 113 further imports the weather forecasting data at locations around the building into the E22 energy simulation software, and also imports the window-opening frequency of the building during the first time, the window-sunshade factor of the building, and the orientation of the building into the E22 energy simulation software such that the E22 energy simulation software can generate an exterior loading chart as shown in FIG. 5A.

Figure 5A:
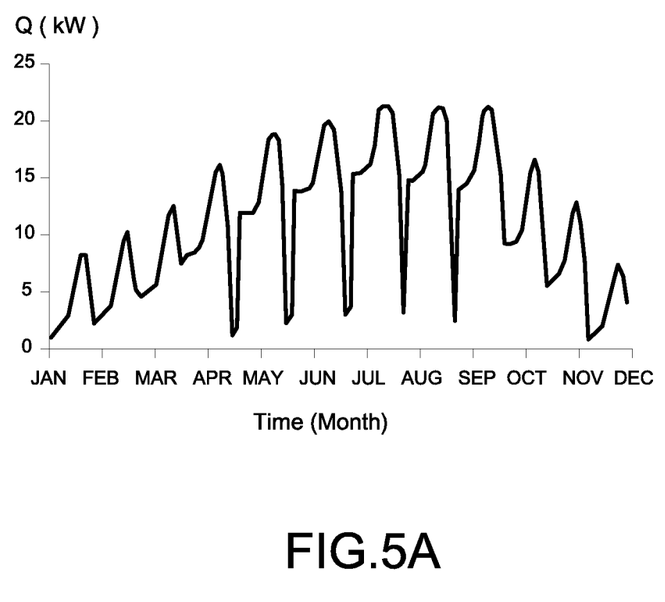
FIG. 5A shows the monthly heat release rate of the building exterior.

FIG. 5A shows the monthly heat release rate Q of the building exterior. Notably, the building generally has four orientations including east, south, west and north. The building exterior-load collecting module 113 will generate four exterior loading charts similar to that shown in FIG. 5A and respectively corresponding to the monthly heat release rate Q of the building exterior for the four orientations. However, this is only for demonstration and is not a limitation for the scope of the present invention.

Moreover, the adjusting system 1 of the present invention further obtains the weather forecasting data for the location of the building during the second time through the weather forecasting data collecting module 114 and outputs the weather forecasting data for the location of the building during the second time (step S16). The second time is later than the first time. In an embodiment, the second time may be 24 hours period after the first time ends. In another embodiment, the second time may be the first peak hours after the first time ends. In this embodiment, the chiller 15 mainly runs at an ice-melting mode during the second time to provide chilled water to the air-conditioner 16.

The weather forecasting data is for example, the hourly outdoor temperature and relative humidity during the second time. It should be noted that the adjusting system 1 of the present invention directly uses the relative humidity as one of the predicting parameters when predicting the loading of the air-conditioner 16 during the second time. The prediction result will be more precise due to the consideration of the latent heat in the building.

The air-condition loading predictor 12 is connected to the data collection unit 11. As shown in FIG. 2, the air-condition loading predictor 12 obtains the scheduling parameters, the indoor-temperature setting condition, the exterior loading factor, and the weather forecasting data respectively through the air-condition scheduler 111, the indoor temperature setting module 112, the building exterior-load collecting module 113, and the weather forecasting data collecting module 114. The air-condition loading predictor 12 accordingly predicts the potential loading of the air-conditioner 16 during the second time and generates a corresponding prediction result (step S18).

Notably, the order for executing the steps S10 to S16 is not fixed. The air-condition scheduler 111, the indoor temperature setting module 112, the building exterior-load collecting module 113, and the weather forecasting data collecting module 114 may output the scheduling parameters, the indoor-temperature setting condition, the exterior loading factor, and the weather forecasting data based on preset order or preset time, and may output those data at the same time upon instruction. The order for executing those steps is not limited by what is shown in FIG. 2.

After step S18, the air-condition loading predictor 12 further provides the prediction result to the energy management platform 13 (step S20), and the energy management platform 13 generates a target ice storage amount based on the received prediction result (step S22), and the energy management platform 13 sends the target ice storage amount, through the central monitoring computer 14, to the chiller 15 (step S24).

In this embodiment, the chiller 15 may determine whether the current ice storage amount is larger than the target ice storage amount after receiving the target ice storage amount (step S26). In this embodiment, the chiller 15 performs the ice making procedure at the moment after the first time and before the second time is reached. Therefore, the "current ice storage amount" in above description is referred to as the remaining number of ices in the chiller 15 after the first time has ended.

If the current ice storage amount in the chiller 15 is larger than the target ice storage amount (this means that an ice tank 151 of the chiller 15 has ice sufficient for the use of the air-conditioner 16 during the second time), then the chiller 15 does not need to adjust the ice storage amount and does not need to perform the ice making procedure. On the contrary, if current ice storage amount in the chiller 15 is not larger than the target ice storage amount, the chiller 15 adjusts the ice storage amount required for the second time based on the target ice storage amount (step S28). After the step S28, when the chiller 15 enters the ice storing mode (namely, leaving the peak hour and entering the off-peak hour), the chiller 15 performs the ice making procedure based on the target ice storage amount such that the ice storage amount of the ice tank 151 may reach the target ice storage amount.

It should be noted that the target ice storage amount is a predicted value and may have considerable deviation with the actual need. To prevent the ice shortage problem of the air-conditioner 16 due to prediction error, in the step S26, the chiller 15 may determine whether the current ice storage amount is larger than 1.1 times of the target ice storage amount. Moreover, the chiller 15 adjusts the ice storage amount to 1.1 times of the target ice storage amount when the current ice storage amount is not larger than 1.1 times of the target ice storage amount. Therefore, the ice shortage problem due to prediction error can be prevented.

The about mentioned 1.1 times is just an example, the choice of 1.1 times is intended to prevent ice shortage problem without over-wasting the energy of the chiller 15.

The ice storage amount of the chiller 15 is not limited to 1.1 times of the target ice storage amount. In other embodiments, the adjusting system 1 of the present invention may set the ice storage amount of the chiller 15 to be 1.2 times or 1.3 times of the target ice storage amount, which is not a limitation to the present invention.

Figure 3:
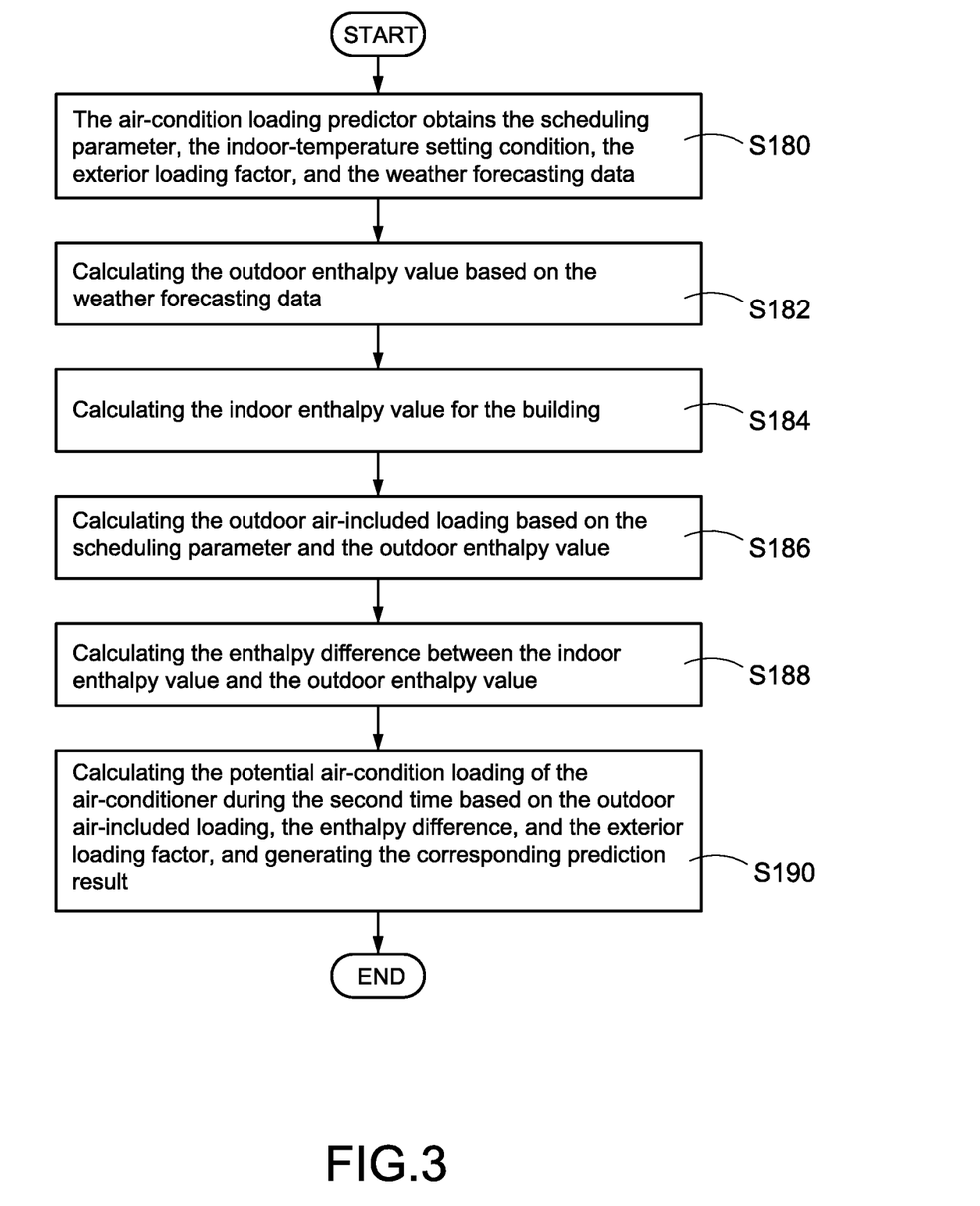
FIG. 3 shows the flowchart of air-condition loading prediction procedure according to the first embodiment of the invention.

FIG. 3 shows the flowchart of air-condition loading prediction procedure according to the first embodiment of the invention. FIG. 3 shows more detailed sub-steps for the step S18 in FIG. 2 and further describes how the air-condition loading predictor 12 predicts the potential loading of the air-conditioner 16 during the second time.

As shown in FIG. 3, after steps S10 to S16 in FIG. 2, the air-condition loading predictor 12 obtains the scheduling parameters, the indoor-temperature setting condition, the exterior loading factor, and the weather forecasting data respectively through the air-condition scheduler 111, the indoor temperature setting module 112, the building exterior-load collecting module 113, and the weather forecasting data collecting module 114 (step S180). Therefore, the air-condition loading predictor 12 may execute a corresponding prediction algorithm to implement the prediction procedure of the present invention.

In this embodiment, the air-condition loading predictor 12 may calculate an outdoor enthalpy value based on the weather forecasting data (step S182). It should be noted that the weather forecasting data comprises the hourly outdoor temperature and relative humidity for the location of the building during the second time. With the consideration of both the temperature and the humidity, and converting the data of temperature/humidity into enthalpy value, the air-condition loading predictor 12 may use the latent heat of the building as one of the prediction parameters during the prediction procedure, thus obtain a more precise prediction result.

In this embodiment, in the step S182, the air-condition loading predictor 12 calculates a partial pressure during the second time according to the following formula 1.

$$P_s = (6.1164 * 10^{(7.591386 * T/T + 240.7263)}) 10 \quad \text{Formula 1}$$

In above formula 1, Ps is the predicted partial pressure during the second time, T is the hourly outdoor temperature according to the weather forecasting data.

The air-condition loading predictor 12 further calculates a humidity ratio during the second time according to the following formula 2.

$$\omega = (0.6219 * P_s * RH/100)/(101.325 - (P_s * RH/100)) \quad \text{Formula 2}$$

In above formula 2, ω is the predicted humidity ratio during the second time, Ps is the predicted partial pressure during the second time, RH is the relative humidity according to the weather forecasting data.

The air-condition loading predictor 12 further calculates the outdoor enthalpy value during the second time according to the following formula 3.

$$H_{oa} T * (1.01 + 1.89 * \omega) + 2500 * \omega \quad \text{Formula 3}$$

In above formula 3, $H_{oa}$ is the predicted outdoor enthalpy value (kJ/kg) during the second time, T is the hourly outdoor temperature according to the weather forecasting data, and ω is the predicted humidity ratio during the second time.

In this embodiment, the air-condition loading predictor 12 first predicts the partial pressure during the second time based on the hourly outdoor temperature in the weather forecasting data, then predicts the humidity ratio during the second time based on the partial pressure and the relative humidity in the weather forecasting data, and finally predicts the outdoor enthalpy value based on the humidity ratio and the hourly outdoor temperature in the weather forecasting data.

Figure 5B:
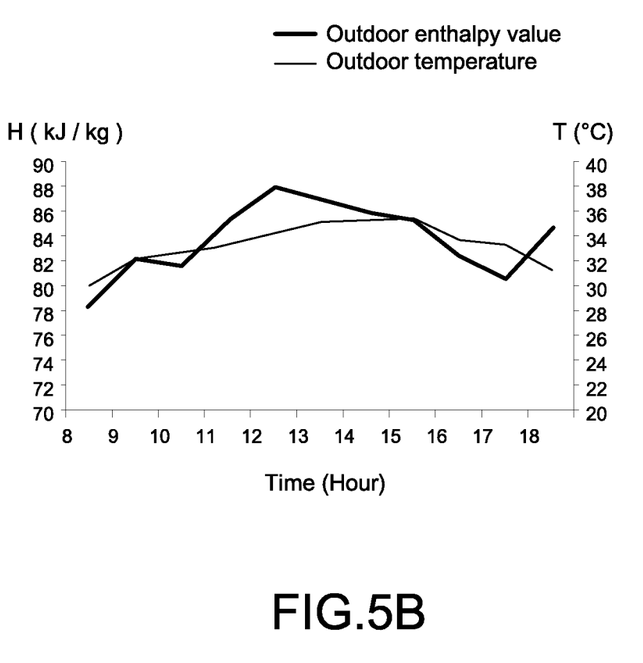
FIG. 5B shows the comparison between outdoor enthalpy value and the outdoor temperature.

Refer also to FIG. 5B, which shows the comparison between outdoor enthalpy value and the outdoor temperature. As can be seen from FIG. 5B, there is inconsistency between the variation of outdoor temperature and the variation of the outdoor temperature sometimes, because the outdoor temperature can only indicate sensible heat and cannot indicate latent heat. To solve this problem, the adjusting method of the present invention considers both the outdoor temperature and the relative humidity and converts the outdoor temperature and the relative humidity into enthalpy value. The adjusting method uses both the sensible heat and the latent heat as predicting parameters in the prediction procedure to obtain a more precise prediction result.

Referred back to FIG. 3, after step S182, the air-condition loading predictor 12 then calculates an indoor enthalpy value for the building during the first time based on the indoor-temperature setting condition (step S184). In this embodiment, the air-condition loading predictor 12 calculates the partial pressure during the first time according to the following formula 4.

$$P_s = (6.1164 * 10^{(7.591386 * T/T + 240.7263)}) 10 \quad \text{Formula 4}$$

In above formula 4, Ps is the predicted partial pressure during the first time and T is indoor-temperature setting condition.

The air-condition loading predictor 12 further calculates the humidity ratio during the first time according to the following formula 5.

$$\omega = (0.6219 * P_s * 65/100)/(101.325 - (P_s * 65/100)) \quad \text{Formula 5}$$

In above formula 5, ω is the humidity ratio during the first time, Ps is the partial pressure during the first time. In this embodiment, an indoor humidity in formula 5 is preset to be 65 due to smaller variation of the indoor humidity.

The air-condition loading predictor 12 further calculates the indoor enthalpy value during the first time according to the following formula 6.

$$H_{indoor} = T * (1.01 + 1.89 * \omega) + 2500 * \omega \quad \text{Formula 6}$$

In above formula 6, $H_{indoor}$ is the indoor enthalpy value during the first time, ω is the humidity ratio during the first time, and T is the indoor-temperature setting condition.

In this embodiment, the air-condition loading predictor 12 first calculates the partial pressure during the first time based on the indoor-temperature setting condition, then calculates the humidity ratio during the first time based on the partial pressure and the preset humidity value (65 in this embodiment), and finally calculates the indoor enthalpy value based on the humidity ratio and the indoor-temperature setting condition.

With reference back to FIG. 3, after the step S184, the air-condition loading predictor 12 further calculates an outdoor air-induced loading based on the scheduling parameter and the calculated outdoor enthalpy value (step S186). The outdoor air-induced loading means the possible increment of heated air due to actively induce outdoor air by the building (for example, executing air exchange between indoor air and outdoor air). In other word, the above step S186 predicts the possible actions to be conducted during the second time by the building, and calculates the possibly-increased heated air due to those actions conducted by the building. The heated air accounts for the possibly-increased loading for the air-conditioner 16 during the second time.

More particularly, the air-condition loading predictor 12 calculates the outdoor air-induced loading according to the following formula 7.

$$\eta*\rho*m*(H_{oa}-40.13)/3600*T_{open} \quad \text{Formula 7}$$

In above formula 7, $\eta$ is an equipment efficiency of the air-conditioner 16, $\rho$ is air density (kg/m³), m is wind amount (CMH), $H_{oa}$ is the calculated outdoor enthalpy value, and $T_{open}$ is the scheduling parameter of the air-conditioner 16. It should be noted that $\eta$ may be a standard equipment efficiency of the air-conditioner 16, which is marked on a case of the air-conditioner 16, while $\rho$ is standard air density, namely, 1.2 (kg/m³), but above examples are not limitation of the present invention.

With reference back to FIG. 3, after step S186, the air-condition loading predictor 12 calculates an enthalpy difference between the indoor enthalpy value and the outdoor enthalpy value (step S188). More particularly, the air-condition loading predictor 12 calculates the enthalpy difference according to the following formula 8.

$$H_{oa}-H_{indoor} \quad \text{Formula 8}$$

Afterward, the air-condition loading predictor 12 calculates the potential air-condition loading of the air-conditioner 16 during the second time based on the outdoor air-induced loading, the enthalpy difference and the exterior loading factor, and then generates the corresponding prediction result (step S190). In this embodiment, the air-condition loading predictor 12 mainly predicts the potential air-condition loading of the air-conditioner 16 based on the outdoor air-induced loading, the enthalpy difference and a plurality of exterior loading factors relevant to different orientations (such as four orientations including east, west, south, and north) of the building. Therefore, the unprecise prediction of convention air-conditioner for the potential loading, which is caused by sole consideration of sensible heat, can be improved.

Figure 4:
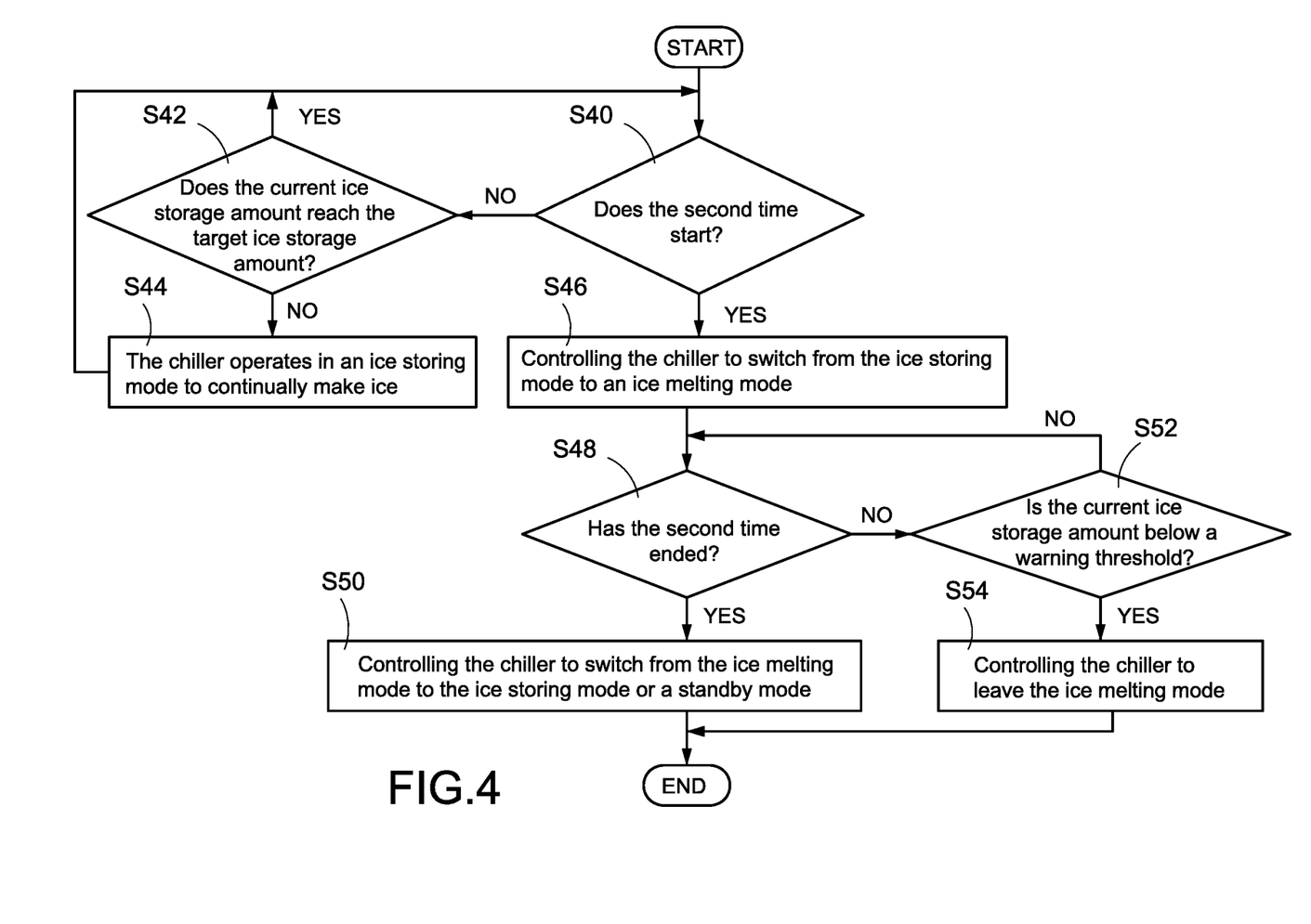
FIG. 4 shows the flowchart of the operation procedure for the chiller according to the first embodiment of the present invention.

Refer to FIG. 4, which shows the flowchart of the operation procedure for the chiller according to the first embodiment of the present invention. The flowchart in FIG. 2 mainly depicts how the adjusting system 1 conducts the prediction procedure with the air-condition loading predictor 12 and adjusts the ice storage amount of the chiller 15 based on the prediction result. The flowchart in FIG. 4 mainly depicts how the chiller 15 properly supplies chilled water to the air-conditioner 16 after the ice making procedure of the chiller 15 is finished.

As shown in FIG. 4, the adjusting system 1 first determines, through the energy management platform 13 or the central monitoring computer 14, whether the second time starts (step S40). In this embodiment, the second time is for example the running time of the air-conditioner 16 (such as working hour or peak hour). On the other hand, the adjusting system 1 further determines, through the energy management platform 13 or the central monitoring computer 14, whether the current ice storage amount of the chiller 15 reaches the target ice storage amount (step S42).

If the second time has not reached and the current ice storage amount of the chiller 15 does not reach the target ice storage amount (or does not reach 1.1 times of the target ice storage amount), the energy management platform 13 controls the chiller 15, through the central monitoring computer 14, to operate in an ice storing mode, and the ice making procedure is executed by the chiller 15 continually in the ice storing mode (step S44).

If the second time is reached and the current ice storage amount of the chiller 15 also reaches the target ice storage amount, the energy management platform 13 controls the chiller 15, through the central monitoring computer 14, to switch its operation from the ice storing mode to an ice melting mode (step S46). In the ice melting mode, the chiller 15 supplies chilled water to the started air-conditioner 16 to realize a temperature adjusting function of the air-conditioner 16.

After the chiller 15 enters the ice melting mode, the adjusting system 1 keeps determining, through the energy management platform 13 or the central monitoring computer 14, whether the second time has ended (step S48). If the second time ends (such as an off-work hour or an off-peak hour starts), it means that the chiller does not need to stay in the ice melting mode. At this time, the energy management platform 13 controls the chiller 15, through the central monitoring computer 14, 15 to switch its operation from the ice melting mode to the ice storing mode or a standby mode (step S50). Therefore, the adjusting system 1 waits for a preset ice storing time, and then performs the steps shown in FIG. 2 for the prediction procedure of air-condition loading if the ice storing time has been reached. The adjusting system 1 controls the chiller 15 to perform the ice making procedure based on the prediction result after the prediction procedure is finished.

Before the second time has ended, the adjusting system 1 keeps determining, through the energy management platform 13 or the central monitoring computer 14, whether the current ice storage amount of the chiller 15 is below a warning threshold (step S52). In one embodiment, the warning threshold is, for example but not limited to, 3% or 5% of the target ice storage amount.

More particularly, the energy wasted by the chiller 15 to re-execute the ice making procedure is larger when the remaining ice in the ice tank 151 is fewer. To prevent energy waste, the energy management platform 13 controls the chiller 15, through the central monitoring computer 14, to leave the ice melting mode (step S54) if the current ice storage amount is below the warning threshold (even the second time does not pass). The potential energy waste needed for the next ice making procedure can be prevented.

By above procedure, the adjusting system 1 of the present invention can predict the potential loading of the air-conditioner 16 for the coming time (such as the working hour tomorrow) based on both the sensible heat and the latent heat. The adjusting system 1 of the present invention controls the chiller 15 to produce ice with number corresponding to the prediction result to prevent the energy waste in the ice making procedure.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. An ice storage amount adjusting system applied for a building, the system comprising:
   a central monitoring computer;
   a chiller communicated with the central monitoring computer and supplying chilled water to an air-conditioner in the building;
   a data collection controller configured to:
   output a scheduling parameter for the air-conditioner during a first time;

output an indoor-temperature setting condition during the first time;
utilize an energy simulation software to output an exterior loading factor during the first time; and
output a weather forecasting data during a second time, wherein the second time is later than the first time; and an air condition loading prediction calculator communicated with the central monitoring computer through an energy management platform, wherein the air condition loading prediction calculator predicts an air-condition loading of the air-conditioner during the second time based on the scheduling parameter, the indoor-temperature setting condition, the exterior loading factor, and the weather forecasting data, and the air condition loading prediction calculator generates a prediction result associated with the air-condition loading and sends the prediction result to the energy management platform;

wherein the energy management platform controls the central monitoring computer to output a target ice storage amount to the chiller based on the prediction result, and the chiller adjusts an ice storage amount required in the second time based on the target ice storage amount;

wherein the chiller performs an ice making procedure after the first time has ended and before the second time is reached, and operates in an ice melting mode in the second time, and wherein the chiller adjusts the ice storage amount based on the target ice storage amount if a current ice storage amount is not larger than the target ice storage amount, wherein the current ice storage amount is an amount of ice left after the first time has ended.

2. The ice storage amount adjusting system in claim 1, wherein the second time is a peak hour that refers to a daily time period of peak electricity demand and cost after the first time ends.

3. The ice storage amount adjusting system in claim 1, wherein the weather forecasting data comprises an outdoor temperature and a relative humidity during the second time.

4. The ice storage amount adjusting system in claim 1, wherein the energy simulation software calculates the exterior loading factor based on a window-opening frequency of the building during the first time, and a window-sunshade factor of the building and an orientation of the building, wherein the window-sunshade factor is a parameter that describes how well installed windows block sunlight from entering the building.

5. The ice storage amount adjusting system in claim 1, wherein the scheduling parameter comprises a timing schedule for a fan controller and a heat recovery ventilator (HRV) during the first time.

6. The ice storage amount adjusting system in claim 1, wherein the data collection controller calculates the indoor-temperature setting condition based on an indoor temperature and an outdoor temperature during the first time.

7. The ice storage amount adjusting system in claim 1, wherein the air condition loading prediction calculator calculates an outdoor enthalpy value based on the weather forecasting data, calculates an indoor enthalpy value based on the indoor-temperature setting condition, calculates an enthalpy difference between the indoor enthalpy value and the outdoor enthalpy value, calculates an outdoor air-induced loading based on the scheduling parameter and the outdoor enthalpy value, and calculates the air-condition loading and generates the prediction result based on the outdoor air-induced loading, the enthalpy difference and the exterior loading factor.

8. The ice storage amount adjusting system in claim 1, wherein the chiller adjusts the ice storage amount to be 110% of the target ice storage amount if it is determined that the current ice storage amount is not larger than 110% of the target ice storage amount.

9. The ice storage amount adjusting system in claim 1, wherein the energy management platform determines whether the current ice storage amount is larger than the target ice storage amount, and the energy management platform controls the chiller to switch from an ice storing mode to an ice melting mode if the current ice storage amount is larger than the target ice storage amount when the second time is reached.

10. The ice storage amount adjusting system in claim 8, wherein the energy management platform determines whether the current ice storage amount is below a warning threshold, and the energy management platform controls the chiller to leave the ice melting mode when the current ice storage amount is below the warning threshold.

11. A method for adjusting ice storage amount, the method applied to a chiller in a building, the chiller communicated with a central monitoring computer and supplying chilled water to an air-conditioner in the building, the method comprising:
a) using a data collection controller to output a scheduling parameter for the air-conditioner during a first time;
b) using the data collection controller to output an indoor-temperature setting condition during the first time;
c) using an energy simulation software to output an exterior loading factor during the first time;
d) using the data collection controller to output a weather forecasting data during a second time, wherein the second time is later than the first time;
e) predicting an air-condition loading of the air-conditioner during the second time based on the scheduling parameter, the indoor-temperature setting condition, the exterior loading factor, and the weather forecasting data, and generating a prediction result;
f) providing the prediction result to an energy management platform; and
g) the energy management platform controlling the central monitoring computer to output a target ice storage amount to the chiller based on the prediction result, and the chiller adjusting an ice storage amount required in the second time based on the target ice storage amount, wherein the chiller performs an ice making procedure after the first time has ended and before the second time is reached, and operates in an ice melting mode in the second time, and the chiller adjusts the ice storage amount based on the target ice storage amount if a current ice storage amount is not larger than the target ice storage amount, wherein the current ice storage amount is an amount of ice left after the first time has ended.

12. The method for adjusting ice storage amount in claim 11, wherein the second time is a peak hour that refers to a daily time period of peak electricity demand and cost after the first time ends.

13. The method for adjusting ice storage amount in claim 11, wherein the weather forecasting data comprises an outdoor-temperature and a relative humidity during the second time; the scheduling parameter comprises a timing schedule for a fan controller and a heat recovery ventilator (HRV) during the first time.

14. The method for adjusting ice storage amount in claim 11, wherein in step b) the data collection controller calculates the indoor-temperature setting condition based on an indoor temperature and an outdoor temperature during the first time; in step c) the energy simulation software calculates the exterior loading factor based on a window-opening frequency of the building during the first time, a window-sunshade factor of the building and an orientation of the building.

15. The method for adjusting ice storage amount in claim 11, wherein in the step e) an air condition loading prediction calculator calculates an outdoor enthalpy value based on the weather forecasting data, calculates an indoor enthalpy value based on the indoor-temperature setting condition, calculates an enthalpy difference between the indoor enthalpy value and the outdoor enthalpy value, calculates an outdoor air-induced loading based on the scheduling parameter and the outdoor enthalpy value, and calculates the air-condition loading and generates the prediction result based on the outdoor air-induced loading, the enthalpy difference and the exterior loading factor.

16. The method for adjusting ice storage amount in claim 11, wherein in the step g) the chiller adjusts the ice storage amount to be 110% of the target ice storage amount if the current ice storage amount is not larger than 110% of the target ice storage amount.

17. The method for adjusting ice storage amount in claim 11, further comprising:
- h1) an energy management platform that determines whether the current ice storage amount is larger than the target ice storage amount and whether the second time is reached; and
- h2) controlling the chiller to switch from an ice storing mode to an ice melting mode if the current ice storage amount is larger than the target ice storage amount and the second time has been reached.

18. The method for adjusting ice storage amount in claim 17, further comprising:
- h3) the energy management platform determining whether the current ice storage amount is below a warning threshold; and
- h4) controlling the chiller to leave the ice melting mode when the current ice storage amount is below the warning threshold.

* * * * *